United States Patent [19]

Nakamura

[11] Patent Number: 4,780,611
[45] Date of Patent: Oct. 25, 1988

[54] RADIATION IMAGE RECORDING AND REPRODUCING METHOD

[75] Inventor: Takashi Nakamura, Kaisei, Japan

[73] Assignee: Fuji Photo Film Co., Ltd., Japan

[21] Appl. No.: 154,288

[22] Filed: Feb. 10, 1988

Related U.S. Application Data

[60] Division of Ser. No. 029,382, Mar. 23, 1987, which is a continuation of Ser. No. 752,539, Jul. 8, 1985, abandoned.

[30] Foreign Application Priority Data

Jul. 9, 1984 [JP]  Japan .................... 59-142010
Jul. 9, 1984 [JP]  Japan .................... 59-142011

[51] Int. Cl.$^4$ ............................. G03C 5/16
[52] U.S. Cl. ..................... 250/327.2; 250/484.1
[58] Field of Search ............ 252/301.4 H; 250/484.1, 250/327.2

[56] References Cited

U.S. PATENT DOCUMENTS 4,713,549 12/1987 Arakawa et al. ............... 250/484.1

FOREIGN PATENT DOCUMENTS 607910 9/1948 United Kingdom ........ 252/301.4 H

OTHER PUBLICATIONS

Young et al., "Phys. Rev.", vol. 176, No. 2, Dec. 1968, pp. 502–509.
Blasse et al., "J. Chem. Phys.", vol. 51, No. 8, Oct. 1969, pp. 3252–32 54.

Primary Examiner—Jack Cooper
Attorney, Agent, or Firm—Gerald J. Ferguson, Jr.

[57] ABSTRACT

A cerium activated a rare earth complex halide phosphor having the formula (I):

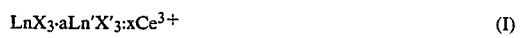

$$LnX_3 \cdot aLn'X'_3 : xCe^{3+} \quad (I)$$

in which each of Ln and Ln' is at least one rare earth element selected from the group consisting of Y, La, Gd and Lu; each of X and X' is at least one halogen selected from the group consisting of F, Cl, Br and I, and $X \neq X'$; and a and x are numbers satisfying the conditions of $0.1 \leq a \leq 10.0$ and $0 < x \leq 0.2$, respectively. A process for the preparation of said phosphor, a radiation image recording and reproducing method utilizing said phosphor, and a radiation image storage panel employing said phosphor are also disclosed.

8 Claims, 6 Drawing Sheets

F I G. 4
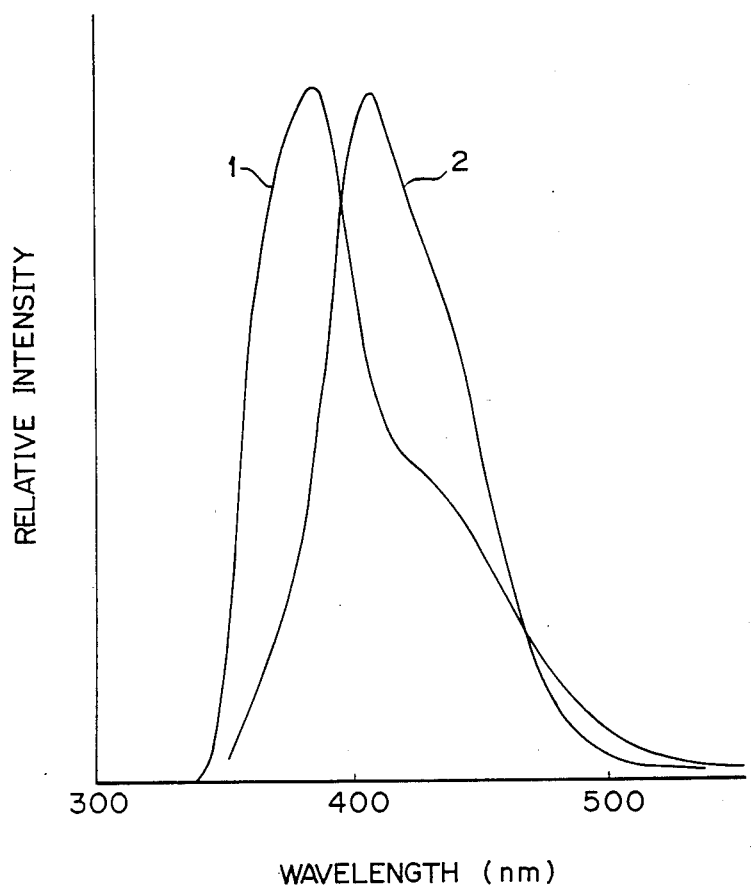

F I G. 4
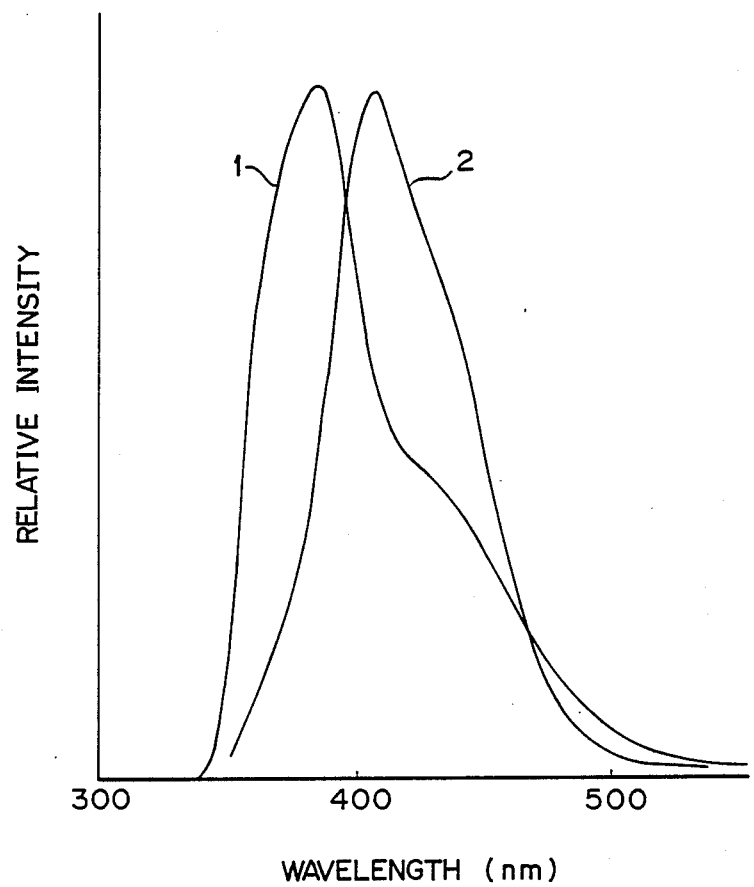

RADIATION IMAGE RECORDING AND REPRODUCING METHOD

This is a divisional application of Ser. No. 029,382, filed Mar. 23, 1987, which is a continuation of Ser. No. 752,539, filed July 8, 1985, now abandoned.

BACKGROUND OF THE INVENTION

1. Field of the Invention

The present invention relates to a novel phosphor, a process for the preparation of the same, a radiation image recording and reproducing method utilizing the same, and a radiation image storage panel employing the same. More particularly, the invention relates to a novel cerium activated rare earth complex halide phosphor.

2. Description of the Prior Art

There is well known a cerium activated rare earth oxyhalide phosphor (LnOX:Ce, in which Ln is at least one rare earth element selected from the group consisting of Y, La, Gd and Lu; and X is at least one halogen selected from the group consisting of Cl and Br) as a cerium activated rare earth halide phosphor. As described in Japanese Patent Provisional Publication No. 55(1980)-12144 (which corresponds to U.S. Pat. No. 4,236,078), etc., the phosphor gives emission (stimulated emission) in the near ultraviolet region when excited with an electromagnetic wave such as visible light or infrared rays after exposure to a radiation such as X-rays, cathode rays or ultraviolet rays. The phosphor is valuable as a stimulable phosphor employable for a radiation image recording and reproducing method.

The radiation image recording and reproducing method utilizing the stimulable phosphor can be employed in place of the conventional radiography utilizing a combination of a radiographic film having an emulsion layer containing a photosensitive silver salt and an intensifying screen as described, for instance, in U.S. Pat. No. 4,239,968. The method involves steps of causing a stimulable phosphor to absorb a radiation having passed through an object or having radiated from an object; sequentially exciting (or scanning) the phosphor with an electromagnetic wave such as visible light or infrared rays (stimulating rays) to release the radiation energy stored in the phosphor as light emission (stimulated emission); photoelectrically detecting the emitted light to obtain electric signals; and reproducing the radiation image of the object as a visible image from the electric signals.

In the radiation image recording and reproducing method, a radiation image is obtainable with a sufficient amount of information by applying a radiation to the object at a considerably smaller dose, as compared with the conventional radiography. Accordingly, this method is of great value, especially when the method is used for medical diagnosis.

For other stimulable phosphors employable in the above-described method, there have been known a divalent europium activated alkaline earth metal fluorohalide phosphor ($M^{II}FX:Eu^{2+}$, in which $M^{II}$ is at least one alkaline earth metal selected from the group consisting of Mg, Ca and Ba; and X is at least one halogen selected from the group consisting of Cl, Br and I); an europium and samarium activated strontium sulfide phosphor (SrS: Eu,Sm); an europium and samarium activated lanthanum oxysulfide phosphor ($La_2O_2S$:Eu,Sm); an europium activated barium aluminate phosphor ($BaO \cdot Al_2O_3$:Eu); an europium activated alkaline earth metal silicate phosphor ($M^{2+}O \cdot SiO_2$:Eu, in which $M^{2+}$ is at least one alkaline earth metal selected from the group consisting of Mg, Ca and Ba), and the like.

SUMMARY OF THE INVENTION

The present invention provides a novel cerium activated rare earth complex halide phosphor which is different from the above-mentioned cerium activated rare earth oxyhalide phosphor, and a process for the preparation of the same.

The present inventor has researched for a stimulable phosphor and newly found that a cerium activated rare earth complex halide phosphor gives stimulated emission as well as spontaneous emission, to accomplish the invention.

The phosphor of the invention is a cerium activated rare earth complex halide phosphor having the formula (I):

$$LnX_3 \cdot aLn'X'_3 : xCe^{3+} \qquad (I)$$

in which each of Ln and Ln' is at least one rare earth element selected from the group consisting of Y, La, Gd and Lu; each of X and X' is at least one halogen selected from the group consisting of F, Cl, Br and I, and $X \neq X'$; and a and x are numbers satisfying the conditions of $0.1 \leq a \leq 10.0$ and $0 < x \leq 0.2$, respectively.

The process for the preparation of the phosphor having the formula (I) of the invention comprises:

mixing starting materials for the phosphor in a stoichiometric ratio corresponding to the formula (II):

$$LnX_3 \cdot aLn'X'_3 : xCe \qquad (II)$$

in which Ln, Ln', X, X', a and x have the same meanings as defined above; and firing the obtained mixture at a temperature within the range of 500°–1400° C. in a weak reducing atmosphere.

The cerium activated rare earth complex halide phosphor having the formula (I) of the invention gives stimulated emission in the near ultraviolet to blue region when excited with an electromagnetic wave having a wavelength within the range of 450–850 nm after exposure to a radiation such as X-rays, ultraviolet rays and cathode rays.

The cerium activated rare earth complex halide phosphor having the formula (I) of the invention also gives emission (spontaneous emission) in the near ultraviolet to blue region when exposed to a radiation such as X-rays, ultraviolet rays and cathode rays.

The present invention further provides a radiation image recording and reproducing method utilizing the novel stimulable phosphor and a radiation image storage panel using said phosphor.

That is, the radiation image recording and reproducing method comprises steps of:

(i) causing the cerium activated rare earth complex halide phosphor having the formula (I) to absorb a radiation having passed through an object or having radiated from an object;

(ii) exciting said stimulable phosphor with an electromagnetic wave having a wavelength within the range of 450–850 nm to release the radiation energy stored therein as light emission; and (iii) detecting the emitted light.

The radiation image storage panel of the invention comprises a support and a stimulable phosphor layer provided thereon which comprises a binder and a stimulable phosphor dispersed therein, in which said phosphor layer contains the cerium therein, in which said phosphor layer contains the cerium activated rare earth complex halide phosphor having the formula (I).

BRIEF DESCRIPTION OF THE DRAWINGS

FIG. 4 shows stimulated emission spectra of the $LaCl_3 \cdot LaBr_3:0.001Ce^{3+}$ phosphor and the $GdCl_3 \cdot GdBr_3: 0.001Ce^{3+}$ phosphor (Curves 1 and 2, respectively).

DETAILED DESCRIPTION OF THE INVENTION

Figure 1:
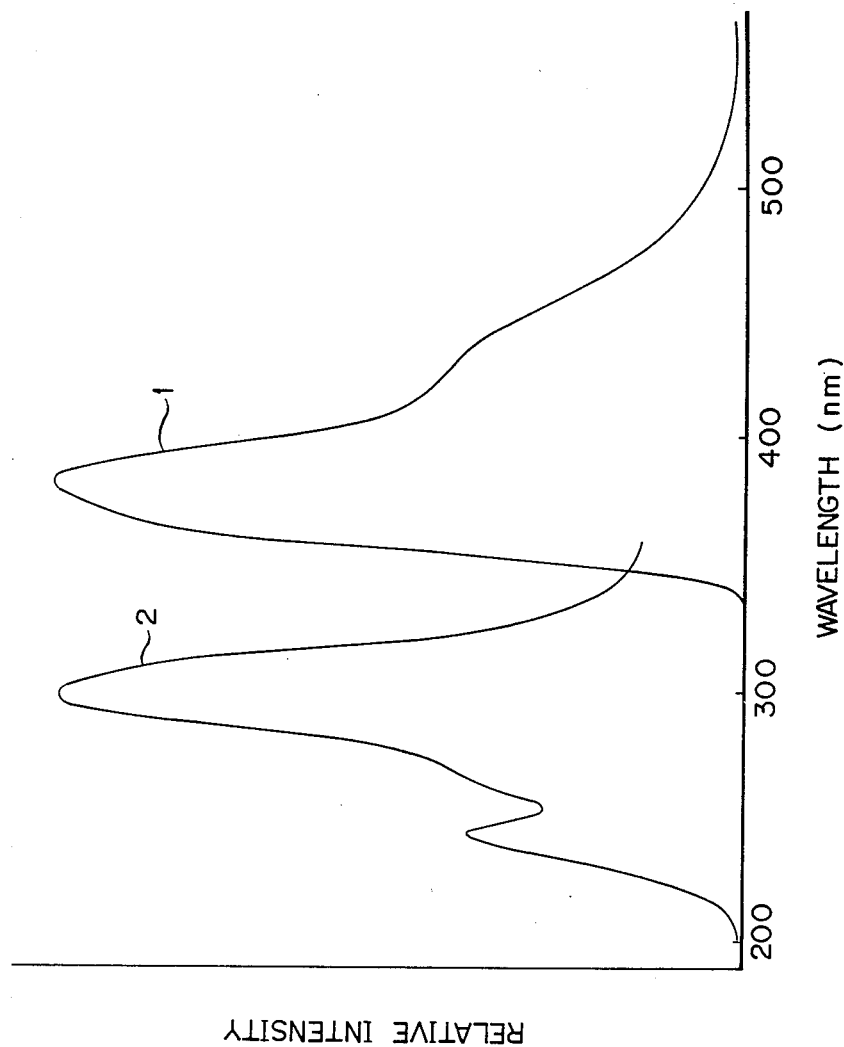
FIG. 1 shows a spontaneous emission spectrum and an excitation spectrum of $LaCl_3 \cdot LaBr_3:0.001Ce^{3+}$ phosphor (Curves 1 and 2, respectively), which is an example of the cerium activated rare earth complex halide phosphor according to the invention.

The cerium activated rare earth complex halide phosphor of the present invention can be prepared, for instance, by a process described below.

As starting materials, the following materials can be employed:

(1) at least two rare earth halides selected from the group consisting of $YF_3$, $YCl_3$, $YBr_3$, $YI_3$, $LaF_3$, $LaCl_3$, $LaBr_3$, $LaI_3$, $GdF_3$, $GdCl_3$, $GdBr_3$, $GdI_3$, $LuF_3$, $LuCl_3$, $LuBr_3$ and $LuI_3$; and (2) at least one compound selected from the group consisting of cerium compounds such as cerium halide, cerium oxide, cerium nitrate and cerium sulfate.

Further, ammonium halide ($NH_4X''$, in which $X''$ is any one of Cl, Br and I) may be employed as a flux.

In the process for the preparation of the phosphor of the invention, the above-mentioned rare earth halides (1) and cerium compound (2) are, in the first place, mixed in the stoichiometric ratio corresponding to the formula (II):

in which each of Ln and Ln' is at least one rare earth element selected from the group consisting of Y, La, Gd and Lu; each of X and X' is at least one halogen selected from the group consisting of F, Cl, Br and I, and $X \neq X'$; and a and x are numbers satisfying the conditions of $0.1 \leq a \leq 10.0$ and $0 < x \leq 0.2$, respectively.

From the viewpoint of enhancement in the intensity of stimulated emission and in the intensity of spontaneous emission, each of Ln and Ln' in the formula (II) which indicates rare earth element is preferably at least one element selected from the group consisting of La and Gd. Ln and Ln' may be the same or different from each other. From the same viewpoint, X indicating halogen is preferably Cl, and X' also indicating halogen is preferably at least one element selected from the group consisting of Br and I. The number for a which indicates the ratio between $LnX_3$ and $Ln'X'_3$ is preferably within the range of $0.25 \leq a \leq 5.0$. From the same viewpoint, the number for x which indicates the amount of cerium activator is preferably within the range of $10^{-5} \leq x \leq 10^{-2}$.

The mixture of starting materials for the phosphor is prepared by any one of the following procedures;

(i) simply mixing the starting materials (1) and (2);

(ii) mixing the starting material (1), heating the obtained mixture at a temperature of not lower than 100° C. for several hours and then mixing the heat-treated mixture with the starting material (2); and (iii) mixing the starting material (1) in the form of a solution, drying the solution by reduced pressure drying, vacuum drying or spray drying under heating (preferably, 50°–200° C.), and then mixing the obtained dry product with the starting material (2).

Further, as a modification of the above procedure ii), there may be mentioned a procedure comprising mixing the starting materials (1) and (2) and subjecting the obtained mixture to the heating treatment. As other modification of the procedure iii), there may be mentioned a procedure comprising mixing the starting materials (1) and (2) in the form of a solution and subjecting the solution to the drying.

The mixing is carried out using a conventional mixing apparatus such as a variety of mixers, a V-type blender, a ball mill and a rod mill in any case of the above-described procedures (i), (ii) and (iii).

Then, the resulting mixture of the starting materials is placed in a heat-resistant container such as a quartz boat, an alumina crucible or a quartz crucible, and fired in an electric furnace. The temperature for the firing suitably ranges from 500° to 1400° C., and preferably ranges from 700° to 1000° C. The firing period is determined depending upon the amount of the mixture of starting materials, the firing temperature, etc., and suitably ranges from 0.5 to 6 hours. As the firing atmosphere, there can be employed a weak reducing atmosphere such as a nitrogen gas atmosphere containing a small amount of hydrogen gas or a carbon dioxide gas atmosphere containing carbon monoxide gas. In the case of using a tetravalent cerium compound as the abovementioned starting material (2), the tetravalent cerium contained in the mixture is reduced into trivalent cerium by the weak reducing atmosphere in the firing stage.

Through the firing procedure, a powdery phosphor of the present invention is produced. The powdery phosphor thus obtained may be processed in a conventional manner involving a variety of procedures for the preparation of phosphors such as a washing procedure, a drying procedure and a sieving procedure.

The phosphor of the invention prepared in accordance with the above-described process is a cerium activated rare earth complex halide phosphor having the formula (I):

in which each of Ln and Ln' is at least one rare earth element selected from the group consisting of Y, La, Gd and Lu; each of X and X' is at least one halogen selected from the group consisting of F, Cl, Br and I, and X≠X'; and a and x are numbers satisfying the conditions of $0.1 \leq a \leq 10.0$ and $0 < x \leq 0.2$, respectively.

The cerium activated rare earth complex halide phosphor of the present invention gives spontaneous emission in the near ultraviolet to blue region (peak wavelength of the emission: approx. 380–410 nm) upon excitation with a radiation such as X-rays, ultraviolet rays and cathode rays.

Figure 2:
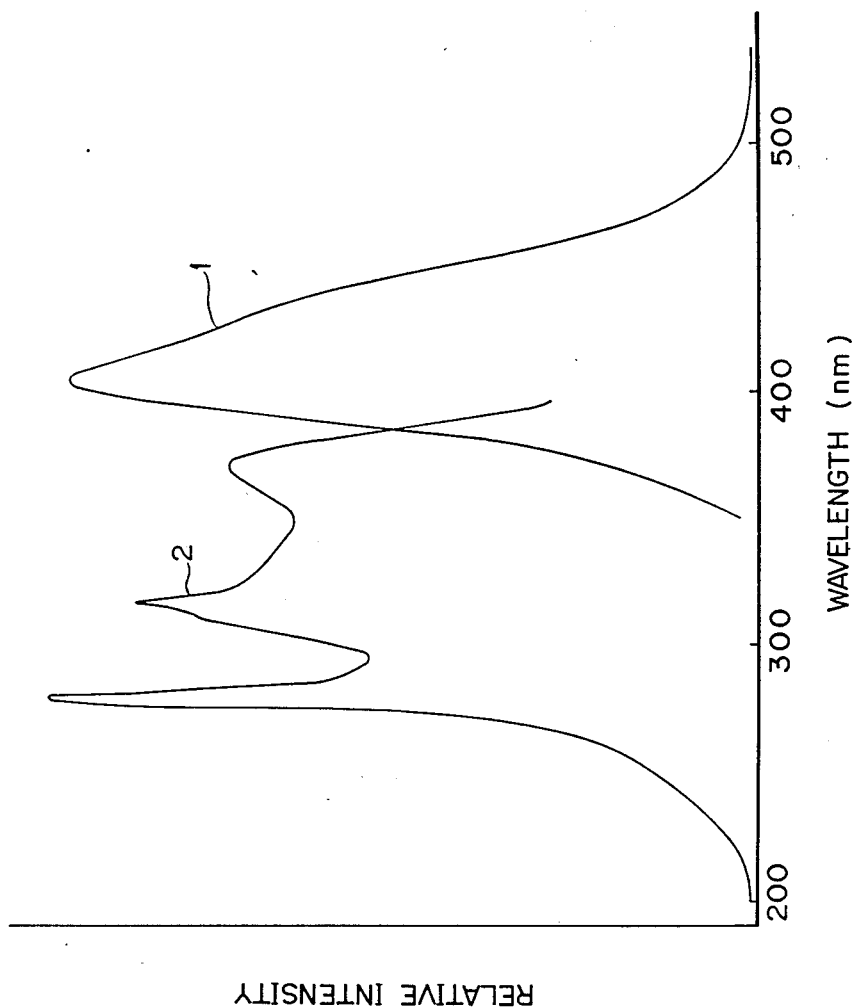
FIG. 2 shows a spontaneous emission spectrum and an excitation spectrum of $GdCl_3 \cdot GdBr_3:0.001Ce^{3+}$ phosphor (Curves 1 and 2, respectively), which is another example of the cerium activated rare earth complex halide phosphor according to the invention.

FIGS. 1 and 2 show examples of spontaneous emission spectra of cerium activated rare earth complex halide phosphors according to the invention, and excitation spectra thereof. In FIG. 1, Curves 1 and 2 indicate a spontaneous emission spectrum and an excitation spectrum of $LaCl_3 \cdot LaBr_3 : 0.001Ce^{3+}$ phosphor, respectively. In FIG. 2, Curves 1 and 2 indicate a spontaneous emission spectrum and an excitation spectrum of $GdCl_3 \cdot GdBr_3 : 0.001Ce^{3+}$ phosphor, respectively.

As is clear from FIGS. 1 and 2, the phosphors according to the invention give spontaneous emission in the near ultraviolet to blue region upon excitation with ultraviolet rays. The peak of the emission spectrum is 380 nm when both of Ln and Ln' constituting the phosphor are La, and 405 nm when both are Gd.

The spontaneous emission spectra upon excitation with ultraviolet rays and excitation spectra of the cerium activated rare earth complex halide phosphors of the invention are illustrated above, for the two kinds of phosphors. It has been confirmed that spontaneous emission spectra and excitation spectra of other phosphors according to the invention are similar to those of the above-stated two kinds of phosphors. Also has been confirmed that the spontaneous emission spectrum of the phosphor of the invention given upon excitation with X-rays or cathode rays are almost the same as those given upon excitation with ultraviolet rays which are shown in FIGS. 1 and 2.

The cerium activated rare earth complex halide phosphor of the invention also gives stimulated emission in the near ultraviolet to blue region when excited with an electromagnetic wave having a wavelength within the region of 450–850 nm such as visible light or infrared rays after exposure to a radiation such as X-rays, ultraviolet rays and cathode rays.

Figure 3:
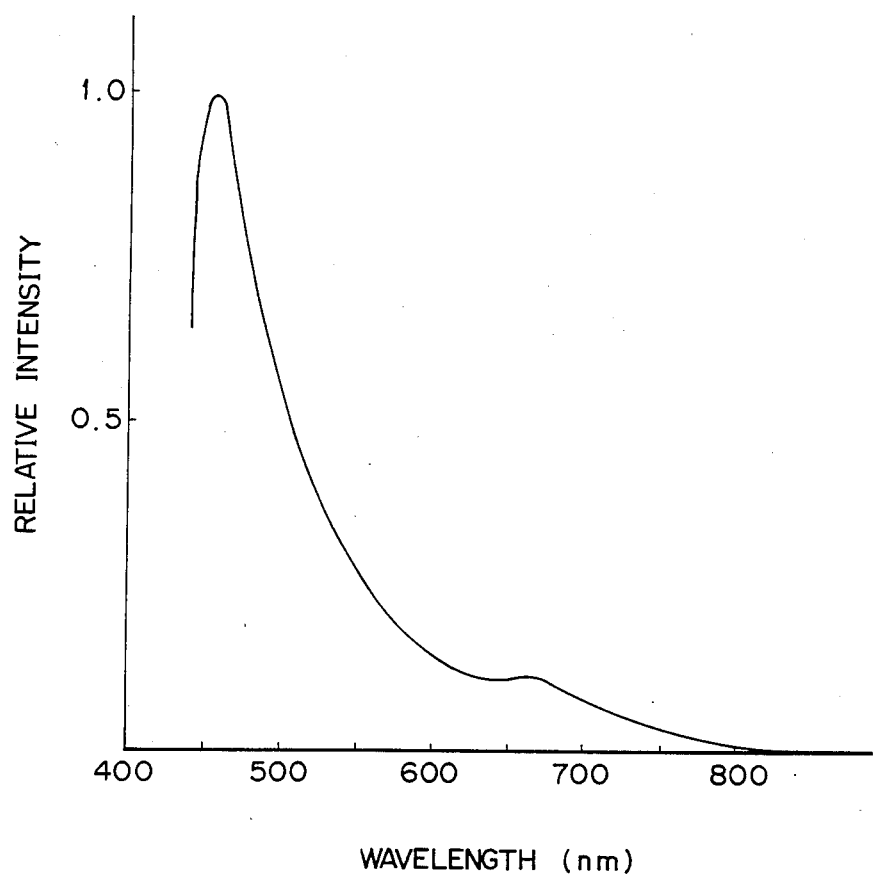
FIG. 3 shows a stimulation spectrum of the $LaCl_3 \cdot LaBr_3:0.001Ce^{3+}$ phosphor.

FIG. 3 shows a stimulation spectrum of $LaCl_3 \cdot LaBr_3 : 0.001Ce^{3+}$ phosphor which is an example of cerium activated rare earth complex halide phosphor of the invention.

As is clear from FIG. 3, the phosphor of the invention give stimulated emission upon excitation with an electromagnetic wave in the wavelength region of 450–850 nm after exposure to X-rays. Particularly, the phosphor exhibits stimulated emission of high intensity upon excitation with an electromagnetic wave in the wavelength region of 450–700 nm. Based on this fact, the wavelength region of the electromagnetic wave employed as stimulating rays, namely 450–850 nm, has been decided in the radiation image recording and reproducing method of the present invention.

FIG. 4 shows examples of stimulated emission spectra of the cerium activated rare earth complex halide phosphors according to the invention:

Curve 1: stimulated emission spectrum of $LaCl_3 \cdot LaBr_3 : 0.001Ce^{3+}$ phosphor; and Curve 2: stimulated emission spectrum of $GdCl_3 \cdot GdBr_3 : 0.001Ce^{3+}$ phosphor.

As is clear from FIG. 4, the phosphors according to the invention give stimulated emission in the near ultraviolet to blue region, and each peak wavelength of the emission spectra is within the range of approx. 380–410 nm. The stimulated emission spectra of the phosphors are in good accordance with the spontaneous emission spectra thereof shown in FIGS. 1 and 2.

The stimulated emission spectra and stimulation spectra of the cerium activated rare earth complex phosphors according to the present invention are illustrated above with respect to the specific phosphors. It has been confirmed that other phosphors according to the invention show the similar stimulated emission characteristics to those of the above-mentioned specific phosphors, and further confirmed that they give stimulated emission in the near ultraviolet to blue region when excited with an electromagnetic wave having a wavelength within the range of 450–850 nm after exposure to a radiation and each peak wavelength is within the range of approx. 380–410 nm.

Figure 5:
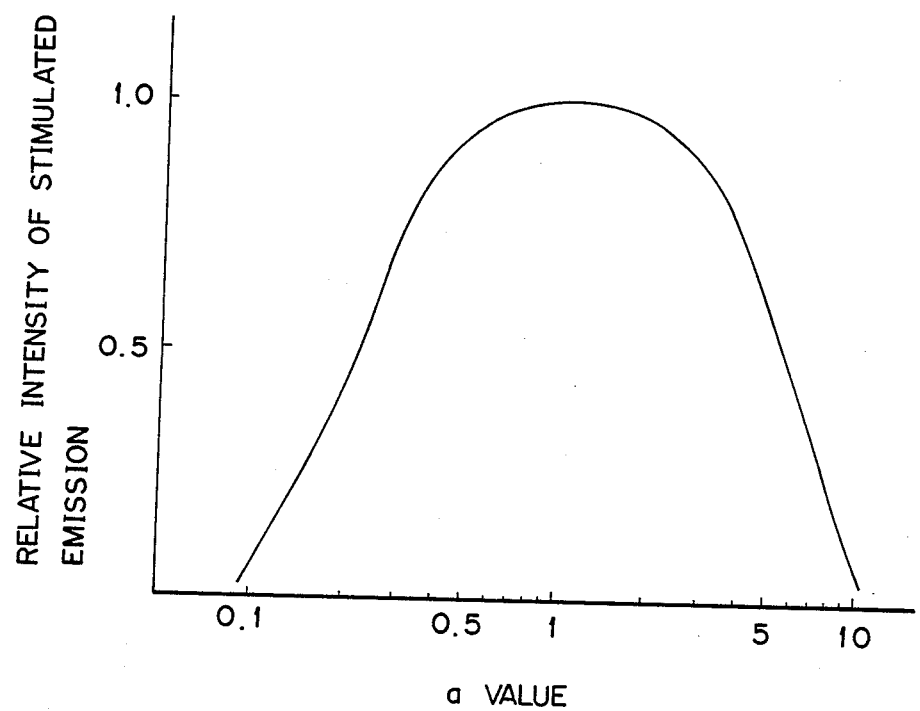
FIG. 5 shows a relationship between a value and an intensity of stimulated emission with respect to $LaCl_3 \cdot aLaBr_3:0.001Ce^{3+}$ phosphor, which is an example of the cerium activated rare earth complex halide phosphor according to the invention.

FIG. 5 graphically shows a relationship between a value and an intensity of stimulated emission [emission intensity upon excitation with a He-Ne laser (wavelength: 632.8 nm) after exposure to X-rays at 80 KVp] with respect to $LaCl_3 \cdot aLaBr_3 : 0.001Ce^{3+}$ phosphor.

As is evident from FIG. 5, the $LaCl_3 \cdot aLaBr_3 : 0.001Ce^{3+}$ phosphor having a value within a range of $0.1 \leq a \leq 10.0$ gives stimulated emission. On the basis of this fact, the a value range ($0.1 \leq a \leq 10.0$) of the phosphor of the invention has been decided. Particularly the phosphor having a value within a range of $0.25 \leq a \leq 5.0$ gives stimulated emission of high intensity.

The phosphor has almost the same tendency as shown in FIG. 5 with respect to the relationship between a value and an intensity of spontaneous emission. It has been further confirmed that other cerium activated rare earth complex halide phosphors according to the invention than the above-mentioned phosphor have the same tendencies on the relationships between a value and the intensity of stimulated emission and between a value and the intensity of spontaneous emission as shown in FIG. 5.

From the viewpoint of emission properties described hereinbefore, the phosphor of the invention is very useful as a phosphor for the use in a radiation image storage panel employed in the radiation image recording and reproducing method, or for a radiographic intensifying screen employed in the conventional radiography, both panel and screen being used in medical radiography such as X-ray photography for medical diagnosis and industrial radiography for non-destructive inspection.

The cerium activated rare earth complex halide phosphor having the formula (I) is preferably employed in the form of a radiation image storage panel (also referred to as a stimulable phosphor sheet) in the radiation image recording and reproducing method of the invention.

The radiation image storage panel comprises a support and at least one phosphor layer provided on one surface of the support. The phosphor layer comprises a binder and a stimulable phosphor dispersed therein. Further, a transparent protective film is generally provided on the free surface of the phosphor layer (surface not facing the support) to keep the phosphor layer from chemical deterioration or physical shock.

The radiation image recording and reproducing method of the invention is desired to be performed employing the radiation image storage panel comprising a phosphor layer which contains the cerium activated rare earth complex halide phosphor having the formula (I).

In the radiation image recording and reproducing method employing the stimulable phosphor having the formula (I) in the form of a radiation image storage panel, a radiation having passed through an object or radiated from an object is absorbed by the phosphor layer of the panel to form a radiation image as a radiation energy-stored image on the panel. The panel is then irradiated (e.g., scanned) with an electromagnetic wave in the wave-length region of 450–850 nm to release the stored image as stimulated emission. The emitted light is photoelectrically detected to obtain electric signals so that the radiation image of the object can be reproduced as a visible image from the obtained electric signals.

The radiation image recording and reproducing method of the present invention will be described more in detail with respect to an example of a radiation image storage panel containing the stimulable phosphor having the formula (I), by referring to a schematic view shown in FIG. 6.

Figure 6:
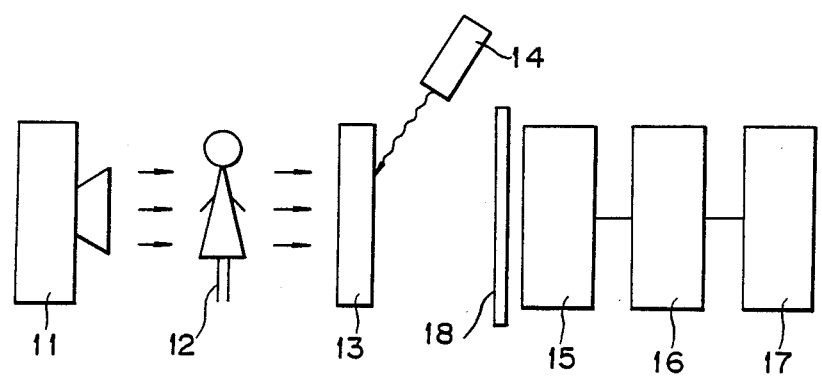
FIG. 6 is a schematic view showing the radiation image recording and reproducing method according to the invention.

In FIG. 6 which shows the total system of the radiation image recording and reproducing method of the invention, a radiation generating device 11 such as an X-ray source provides a radiation for irradiating an object 12 therewith; a radiation image storage panel 13 containing the stimulable phosphor having the formula (I) absorbs and stores the radiation having passed through the object 12; a source of stimulating rays 14 provides an electromagnetic wave for releasing the radiation energy stored in the panel 13 as light emission; a photosensor 15 such as a photomultiplier faces the panel 13 for detecting the light emitted by the panel 13 and converting it to electric signals; an image reproducing device 16 is connected with the photosensor 15 to reproduce a radiation image from the electric signals detected by the photosensor 15; a display device 17 is connected with the reproducing device 16 to display the reproduced image in the form of a visible image on a CRT or the like; and a filter 18 is disposed in front of the photosensor 15 to cut off the stimulating rays reflected by the panel 13 and allow only the light emitted by the panel 13 to pass through.

FIG. 6 illustrates an example of the system according to the method of the invention employed for obtaining a radiation-transmission image of an object. However, in the case that the object 12 itself emits a radiation, it is unnecessary to install the above-mentioned radiation generating device 11. Further, the photosensor 15 to the display device 17 in the system can be replaced with other appropriate devices which can reproduce a radiation image having the information of the object 12 from the light emitted by the panel 13.

Referring to FIG. 6, when the object 12 is exposed to a radiation such as X-rays provided by the radiation generating device 11, the radiation passes through the object 12 in proportion to the radiation transmittance of each portion of the object. The radiation having passed through the object 12 impinges upon the radiation image storage panel 13, and is absorbed by the phosphor layer of the panel 13. Thus, a radiation energy-stored image (a kind of latent image) corresponding to the radiation-transmission image of the object 12 is formed on the panel 13.

Thereafter, when the radiation image storage panel 13 is irradiated with an electromagnetic wave having the wavelength within the range of 450–850 nm, which is provided by the source of stimulating rays 14, the radiation energy-stored image formed on the panel 13 is released as light emission. The intensity of so released light is in proportion to the intensity of the radiation energy which has been absorbed by the phosphor layer of the panel 13. The light signals corresponding to the intensity of the emitted light are converted to electric signals by means of the photosensor 15, the electric signals are reproduced as an image in the image reproducing device 16, and the reproduced image is displayed on the display device 17.

The operation of reading out the image information stored in the radiation image storage panel is generally carried out by sequentially scanning the panel with a laser beam and detecting the light emitted under the scanning with a photosensor such as photomultiplier through an appropriate light guiding means to obtain electric signals. In order to obtain a well-readable visible image, the read-out operation may comprise a preliminary read-out operation and a final read-out operation, in which the panel is twice irradiated with stimulating rays through the energy of the stimulating rays in the former is lower than that in the latter (see: U.S. patent application No. 434,886). The read-out condition in the final read-out operation can be suitably set based on the result obtained by the preliminary read-out operation.

As the photosensor, solid-state photoelectric conversion devices such as a photoconductor and a photodiode can be also used (see: U.S. patent application No. 610,582, Japanese Patent Applications No. 58(1983)-219313 and No. 58(1983)-219314, and Japanese Patent Provisional Publication No. 58(1983)-121874). For example, the photosensor is divided into a great number of pixels, which may be combined with a radiation image storage panel or positioned in the vicinity of the panel. Otherwise, the photosensor may be a linesensor in which plural pixels are linearly connected or may be such one that corresponds to one pixel.

In the above-mentioned cases, there may be employed for the source of stimulating rays a linear light source such as an array in which light emitting diodes (LED), semiconductor lasers or the like are linearly arranged, in addition to a point light source such as a laser. The read-out using such photosensor can prevent loss of the light emitted by a panel and can bring about the enhancement of S/N ratio of the image, because the photosensor can receive the emitted light with a large angle. It is also possible to enhance the read-out speed, because electric signals are sequentially obtained not by scanning the panel with stimulating rays, but by electrical processing of the photosensor.

After reading out the image information stored in a radiation image storage panel, the panel is preferably subjected to a procedure of erasing the radiation energy remaining therein, that is, to the exposure to light having a wavelength in the wavelength region of stimulating rays for the phosphor contained therein or to heating (see: U.S. Pat. No. 4,400,619 and Japanese Patent Provisional Publication No. 56(1981)-12599). The erasing procedure can prevent the occurrence of noise originating from the after image in the next use of the panel. Further, the panel can be more effectively prevented from the occurrence of noise attributable to natural radiations by carrying out the erasing procedure twice, namely after the read-out and just before the next use (see: U.S. patent application No. 338,734).

In the radiation image recording and reproducing method of the present invention, there is no specific limitation on the radiation employable for exposure of an object to obtain a radiation transmittance image thereof, as far as the above-described phosphor gives stimulated emission upon excitation with the electromagnetic wave after exposure to the radiation. Examples of the radiation employable in the invention include those generally known, such as X-rays, cathode rays and ultraviolet rays. Likewise, there is no specific limitation on the radiation radiating from an object for obtaining a radiation image thereof, as far as the radiation can be absorbed by the above-described phosphor to serve as an energy source for producing the stimulated emission. Examples of the radiation include $\gamma$-rays, $\alpha$-rays and $\beta$-rays.

As the source of stimulating rays for exciting the phosphor which has absorbed the radiation having passed through or radiated from the object, there can be employed, for instance, light sources providing light having a band spectrum distribution in the wavelength region of 450–850 nm; and light sources providing light having a single wavelength or more in said region such as an Ar ion laser, a Kr ion laser, a He-Ne laser, a ruby laser, a semiconductor laser, a glass laser, a YAG laser, a dye laser and a light emitting diode (LED). Among the above-mentioned sources of stimulating rays, the lasers are preferred because the radiation image storage panel is exposed thereto with a high energy density per unit area. Particularly preferred are the Ar ion laser, He-Ne laser and Kr ion laser, from the viewpoints of the stability and output power thereof. The semiconductor laser is also preferred, because its size is small, it can be driven by a weak electric power and its output power can be easily stabilized owing to the direct modulation thereof.

As the light source for erasing the radiation energy remaining in the radiation image storage panel, a light source at least providing light of a wavelength within the wavelength region of stimulating rays for the above-mentioned phosphor is employed. Examples of the light source employable in the method of the present invention include a fluorescent lamp, a tungsten lamp and a halogen lamp.

The recording and read-out of a radiation image in the method of the invention can be carried out by using a built-in type radiation image conversion apparatus which comprises a recording section for recording the radiation image on the radiation image storage panel (i.e., causing a stimulable phosphor of the panel to absorb and store radiation energy), a read-out section for reading out the radiation image recorded on the panel (i.e., exciting the phosphor with stimulating rays to release the radiation energy as light emission), and an erasure section for eliminate the radiation image remained in the panel (i.e., causing the phosphor to release the remaining energy) (see: U.S. patent application Nos. 434,883 and 600,689). By employing such built-in type apparatus, the radiation image storage panel (or a recording medium containing a stimulable phosphor) can be circularly and repeatedly used and a number of images having a quality at a certain level can be stably obtained. The radiation image conversion apparatus can be made so compact and light weight as to easily set and move the apparatus. It is further possible to move the apparatus place to place to record the radiation images for mass examinations by loading a traveling X-ray diagnosis station in the form of a vehicle like a bus with the apparatus.

The radiation image storage panel employable in the radiation image recording and reproducing method of the invention will be described.

The radiation image storage panel, as described hereinbefore, comprises a support and a phosphor layer provided thereon which comprises a binder and the above-described cerium activated rare earth complex halide phosphor having the formula (I) dispersed therein.

The radiation image storage panel having such structure can be prepared, for instance, in the manner described below.

Examples of the binder to be employed in the phosphor layer include: natural polymers such as proteins (e.g. gelatin), polysaccharides (e.g. dextran) and gum arabic; and synthetic polymers such as polyvinyl butyral, polyvinyl acetate, nitrocellulose, ethylcellulose, vinylidene chloride-vinyl chloride copolymer, polyalkyl (meth)acrylate, vinyl chloride-vinyl acetate copolymer, polyurethane, cellulose acetate butyrate, polyvinyl alcohol, and linear polyester. Particularly preferred are nitrocellulose, linear polyester, polyalkyl (meth)-acrylate, a mixture of nitrocellulose and linear polyester, and a mixture of nitrocellulose and polyalkyl (meth)acrylate.

The phosphor layer can be formed on a support, for instance, by the following procedure.

In the first place, the stimulable phosphor particles and a binder are added to an appropriate solvent, and then they are mixed to prepare a coating dispersion of the phosphor particles in the binder solution.

Examples of the solvent employable in the preparation of the coating dispersion include lower alcohols such as methanol, ethanol, n-propanol and n-butanol; chlorinated hydrocarbons such as methylene chloride and ethylene chloride; ketones such as acetone, methyl ethyl ketone and methyl isobutyl ketone; esters of lower alcohols with lower aliphatic acids such as methyl acetate, ethyl acetate and butyl acetate; ethers such as dioxane, ethylene glycol monoethylether and ethylene glycol monomethylether; and mixtures of the above-mentioned compounds.

The ratio between the binder and the phosphor in the coating dispersion may be determined according to the characteristics of the aimed radiation image storage panel and the nature of the phosphor employed. Generally, the ratio therebetween is within the range of from 1:1 to 1:100 (binder:phosphor, by weight), preferably from 1:8 to 1:40.

The coating dispersion may contain a dispersing agent to assist the dispersibility of the phosphor particles therein, and also contain a variety of additives such as a plasticizer for increasing the bonding between the binder and the phosphor particles in the phosphor layer. Examples of the dispersing agent include phthalic acid, stearic acid, caproic acid and a hydrophobic surface active agent. Examples of the plasticizer include phosphates such as triphenyl phosphate, tricresyl phosphate and diphenyl phosphate; phthalates such as diethyl phthalate and dimethoxyethyl phthalate; glycolates such as ethylphthalyl ethyl glycolate and butylphthalyl butyl glycolate; and polyesters of polyethylene glycols with aliphatic dicarboxylic acids such as polyester of triethylene glycol with adipic acid and polyester of diethylene glycol with succinic acid.

The coating dispersion containing the phosphor particles and the binder prepared as described above is applied evenly to the surface of a support to form a layer of the coating dispersion. The coating procedure can be carried out by a conventional method such as a method using a doctor blade, a roll coater or a knife coater.

A support material employed in the present invention can be selected from those employed in the conventional radiographic intensifying screens or those employed in the known radiation image storage panels. Examples of the support material include plastic films such as films of cellulose acetate, polyester, polyethylene terephthalate, polyamide, polyimide, triacetate and polycarbonate; metal sheets such as aluminum foil and aluminum alloy foil; ordinary papers; baryta paper; resin-coated papers; pigment papers containing titanium dioxide or the like; and papers sized with polyvinyl alcohol or the like. From the viewpoint of characteristics of a radiation image storage panel as an information recording material, a plastic film is preferably employed as the support material of the invention. The plastic film may contain a light-absorbing material such as carbon black, or may contain a light-reflecting material such as titanium dioxide. The former is appropriate for preparing a high-sharpness type radiation image storage panel, while the latter is appropriate for preparing a high-sensitive type radiation image storage panel.

In the preparation of a known radiation image storage panel, one or more additional layers are occasionally provided between the support and the phosphor layer, so as to enhance the adhesion between the support and the phosphor layer, or to improve the sensitivity of the panel or the quality of an image provided thereby. For instance, a subbing layer or an adhesive layer may be provided by coating a polymer material such as gelatin over the surface of the support on the phosphor layer side. Otherwise, a light-reflecting layer or a light-absorbing layer may be provided by forming a polymer material layer containing a light-reflecting material such as titanium dioxide or a light-absorbing material such as carbon black. In the invention, one or more of these additional layers may be provided.

As described in U.S. patent application No. 496,278 or European Patent Publication No. 92241, the phosphor layer-side surface of the support (or the surface of an adhesive layer, light-reflecting layer, or light-absorbing layer in the case that such layers are provided on the phosphor layer) may be provided with protruded and depressed portions for enhancement of the sharpness of radiation image.

After applying the coating dispersion to the support as described above, the coating dispersion is then heated slowly to dryness so as to complete the formation of a phosphor layer. The thickness of the phosphor layer varies depending upon the characteristics of the aimed radiation image storage panel, the nature of the phosphor, the ratio between the binder and the phosphor, etc. Generally, the thickness of the phosphor layer is within the range of from 20 $\mu$m to 1 mm, preferably from 50 to 500 $\mu$m.

The phosphor layer can be provided on the support by the methods other than that given in the above. For instance, the phosphor layer is initially prepared on a sheet (false support) such as a glass plate, metal plate or plastic sheet using the aforementioned coating dispersion and then thus prepared phosphor layer is overlaid on the genuine support by pressing or using an adhesive agent.

The phosphor layer placed on the support can be in the form of a single layer or in the form of plural (two or more) layers. When the plural phosphor layers are placed, at least one layer contains the aforementioned cerium activated rare earth complex halide phosphor having the formula (I), and the plural layers may be placed in such a manner that a layer nearer to the surface shows stimulated emission of higher intensity. In any case, that is, in either the single phosphor layer or plural phosphor layers, a variety of known stimulable phosphors are employable in combination with the above-mentioned stimulable phosphor.

Examples of the stimulable phosphor employable in combination with the stimulable phosphor of the invention include the aforementioned phosphor and the phosphors described below;

ZnS:Cu,Pb, BaO·xAl$_2$O$_3$:Eu, in which x is a number satisfying the condition of $0.8 \leq x \leq 10$, and M$^{II}$O·xSiO$_2$:A, in which M$^{II}$ is at least one divalent metal selected from the group consisting of Mg, Ca, Sr, Zn, Cd and Ba, A is at least one element selected from the group consisting of Ce, Tb, Eu, Tm, Pb, Tl, Bi and Mn, and x is a number satisfying the condition of $0.5 \leq x \leq 2.5$, as described in U.S. Pat. No. 4,326,078;

(Ba$_{1-x-y}$, Mg$_x$, Ca$_y$)FX:aEu$^{2+}$, in which X is at least one element selected from the group consisting of Cl and Br, x and y are numbers satisfying the conditions of $0 < x+y \leq 0.6$, and $xy \neq 0$, and a is a number satisfying the condition of $10^{-6} \leq a \leq 5 \times 10^{-2}$, as described in Japanese Patent Provisional Publication No. 55(1980)-12143; and LnOX:xA, in which Ln is at least one element selected from the group consisting of La, Y, Gd and Lu, X is at least one element selected from the group consisting of Cl and Br, A is at least one element selected from the group consisting of Ce and Tb, and x is a number satisfying the condition of $0 < x < 0.1$, as described in the above-mentioned U.S. Pat. No. 4,236,078.

A radiation image storage panel generally has a transparent film on a free surface of a phosphor layer to physically and chemically protect the phosphor layer. In the panel of the invention, it is preferable to provide a transparent film for the same purpose.

The transparent film can be provided on the phosphor layer by coating the surface of the phosphor layer with a solution of a transparent polymer such as a cellulose derivative (e.g. cellulose acetate or nitrocellulose), or a synthetic polymer (e.g. polymethyl methacrylate, polyvinyl butyral, polyvinyl formal, polycarbonate, polyvinyl acetate, or vinyl chloride-vinyl acetate copolymer), and drying the coated solution. Alternatively, the transparent film can be provided on the phosphor layer by beforehand preparing it from a polymer such as polyethylene terephthalate, polyethylene, polyvinylidene chloride or polyamide, followed by placing and fixing it onto the phosphor layer with an appropriate adhesive agent. The transparent protective film preferably has a thickness within the range of approximately 0.1 to 20 $\mu$m.

The present invention will be illustrated by the following examples, but these examples by no means restrict the invention.

EXAMPLE 1

To 800 ml of distilled water (H$_2$O) were added 245.27 g. of lanthanum chloride (LaCl$_3$), 378.91 g. of lanthanum bromide (LaBr$_3$) and 0.172 g. of cerium oxide (CeO$_2$), and they were mixed to obtain an aqueous solution. The aqueous solution was dried at 60° C. under reduced pressure for 3 hours and further dried at 150° C. under vacuum for another 3 hours to obtain a mixture of starting materials for the preparation of a phosphor.

The mixture thus obtained was placed in an alumina crucible, which was, in turn, placed in a high-temperature electric furnace. The mixture was then fired at 900° C. for 1.5 hours under a carbon dioxide atmosphere containing carbon monoxide. After the firing was complete, the crucible was taken out of the furnace and allowed to stand for cooling. Thus, a powdery cerium activated lanthanum chlorobromide phosphor (LaCl$_3$·LaBr$_3$: 0.001Ce$^{3+}$) was obtained.

EXAMPLE 2

The procedure of Example 1 was repeated except for using 263.61 g. of gadolinium chloride (GdCl$_3$) and 396.98 g. of gadolinium bromide (GdBr$_3$) instead of lanthanum chloride and lanthanum bromide, to obtain a powdery cerium activated gadolinium chlorobromide phosphor (GdCl$_3$·GdBr$_3$:0.001Ce$^{3+}$).

The phosphors prepared in Examples 1 and 2 were excited with ultraviolet rays to measure spontaneous emission spectra and excitation spectra.

The results are shown in FIGS. 1 and 2.

In FIG. 1, Curves 1 and 2 correspond to the following spectra:
 1: spontaneous emission spectrum of LaCl$_3$·LaBr$_3$: 0.001Ce$^{3+}$ phosphor; and
 2: excitation spectrum of LaCl$_3$·LaBr$_3$:0.001Ce$^{3+}$ phosphor.

In FIG. 2, Curves 1 and 2 correspond to the following spectra:
 1: spontaneous emission spectrum of GdCl$_3$·GdBr$_3$: 0.001Ce$^{3+}$ phosphor; and
 2: excitation spectrum, of GdCl$_3$·GdBr$_3$: 0.001Ce$^{3+}$ phosphor.

Further, the phosphor prepared in Example 1 was excited with a light whose wavelength was varied in the range of 450–850 nm after exposure to X-rays at 80 KVp, to measure stimulation spectrum at the peak wavelength of the emission (380 nm). The result is shown in FIG. 3.

FIG. 3 shows the stimulation spectrum of LaCl$_3$·LaBr$_3$:0.001Ce$^{3+}$ phosphor.

Furthermore, the phosphors prepared in Examples 1 and 2 were excited with a He-Ne laser (wavelength: 632.8 nm) after exposure to X-rays at 80 KVp, to measure stimulated emission spectra. The results are shown in FIG. 4.

In FIG. 4, Curves 1 and 2 correspond to the following spectra:
 1: stimulated emission spectrum of LaCl$_3$·LaBr$_3$: 0.001Ce$^{3+}$ phosphor (Example 1); and
 2: stimulated emission spectrum of GdCl$_3$·GdBr$_3$: 0.001Ce$^{3+}$ phosphor (Example 2).

EXAMPLE 3

The procedure of Example 1 was repeated except for varying the amount of lanthanum bromide within a range of 0–10.0 mols per 1 mol of lanthanum chloride, to obtain a variety of powdery cerium activated lanthanum chlorobromide phosphors (LaCl$_3$·aLaBr$_3$:0.001Ce$^{3+}$).

The phosphors prepared in Example 3 were excited with a He-Ne laser after exposure to X-rays at 80 KVp, to measure the intensity of stimulated emission. The results are shown in FIG. 5.

FIG. 5 graphically shows a relationship between the amount of lanthanum bromide (a value) and an intensity of stimulated emission with respect to LaCl$_3$·aLaBr$_3$: 0.001Ce$^{3+}$ phosphor.

EXAMPLE 4

To a mixture of the powdery cerium activated lanthanum chlorobromide phosphor (LaCl$_3$·LaBr$_3$:0.001Ce$^{3+}$) obtained in Example 1 and a linear polyester resin were added successively methyl ethyl ketone and nitrocellulose (nitrification degree: 11.5%), to prepare a dispersion containing the phosphor and the binder (10:1, by weight). Subsequently, tricresyl phosphate, n-butanol and methyl ethyl ketone were added to the dispersion. The mixture was sufficiently stirred by means of a propeller agitater to obtain a homogeneous coating dispersion having a viscosity of 25–35 PS (at 25° C.).

The coating dispersion was applied to a polyethylene terephthalate sheet containing titanium dioxide (support, thickness: 250 μm) placed horizontally on a glass plate. The application of the coating dispersion was carried out using a doctor blade. The support having a layer of the coating dispersion was then placed in an oven and heated at a temperature gradually rising from 25° to 100° C. Thus, a phosphor layer having a thickness of 250 μm was formed on the support.

On the phosphor layer was placed a transparent polyethylene terephthalate film (thickness: 12 μm; provided with a polyester adhesive layer on one surface) to combine the transparent film and the phosphor layer with the adhesive layer.

Thus, a radiation image storage panel consisting essentially of a support, a phosphor layer and a transparent protective film was prepared.

EXAMPLE 5

The procedure of Example 4 was repeated except for employing the GdCl$_3$·GdBr$_3$:0.001Ce$^{3+}$ phosphor obtained in Example 2 instead of the LaCl$_3$·LaBr$_3$: 0.001Ce$^{3+}$ phosphor, to prepare a radiation image storage panel consisting essentially of a support, a phosphor layer and a transparent protective film.

The radiation image storage panels prepared in Examples 4 and 5 were measured on the sensitivity (i.e., intensity of stimulated emission) when excited with a He-Ne laser (wavelength: 632.8 nm) after exposure to X-rays at 80 KVp.

The results on the evaluation of the panels are set forth in Table 1, wherein the sensitivity of the panel is represented by a relative value based on that of a panel, which was prepared by repeating the procedure of Example 4 except for employing the aforementioned LnOBr:Ce$^{3+}$ phosphor, being 100 under the same conditions.

TABLE 1

| Example | Relative Sensitivity |
|---|---|
| 4 | 25 |
| 5 | 10 |

I claim:
1. A radiation image recording and reproducing method comprising the steps of:

(i) causing a cerium activated rare earth complex halide stimulable phosphor having the formula (I):

$$LnX_3 \cdot aLn'X'_3 : xCe^{3+} \quad (I)$$

in which each of Ln and Ln' is at least one rare earth element selected from the group consisting of Y, La, Gd and Lu; each of X and X' is at least one halogen selected from the group consisting of F, Cl, Br and I, and $X \neq X'$; and a and x are numbers satisfying the conditions of $0.25 \leq a \leq 5.0$ and $0 < x \leq 0.2$, respectively, wherein the phosphor exhibits a higher intensity of stimulated emission when excited by 632.8 nm radiation after exposure to x-rays at $80KV_p$ than said phosphor where a is less than 0.25 or greater than 5.0, to absorb a radiation having passed through an object or having radiated from an object;

(ii) exciting said stimulable phosphor with an electromagnetic wave having a wavelength within the range of 450–850 nm to release the radiation energy stored therein as light emission; and (iii) detecting the emitted light.

2. The radiation image recording and reproducing method as claimed in claim 1, in which a in the formula (I) is 1.

3. The radiation image recording and reproducing method as claimed in claim 1, in which each of Ln and Ln' in the formula (I) is at least one rare earth element selected from the group consisting of La and Gd.

4. The radiation image recording and reproducing method as claimed in claim 1, in which X in the formula (I) is Cl.

5. The radiation image recording and reproducing method as claimed in claim 1, in which X' in the formula (I) is at least one halogen selected from the group consisting of Br and I.

6. The radiation image recording and reproducing method as claimed in claim 1, in which x in the formula (I) is a number satisfying the condition of $10^{-5} \leq x \leq 10^{-2}$.

7. The radiation image recording and reproducing method as claimed in claim 1, in which said electromagnetic wave is one having a wavelength within the range of 450–700 nm.

8. The radiation image recording and reproducing method as claimed in claim 1, in which said electromagnetic wave is a laser beam.

* * * * *